United States Patent
Vagarappan Ulaganathan et al.

(10) Patent No.: US 12,292,500 B2
(45) Date of Patent: May 6, 2025

(54) PEOPLE COUNTING BASED ON RADAR MEASUREMENT

(71) Applicant: Infineon Technologies AG, Neubiberg (DE)

(72) Inventors: Raghavendran Vagarappan Ulaganathan, Munich (DE); Andrea Heinz, Munich (DE); Avik Santra, Munich (DE)

(73) Assignee: Infineon Technologies AG, Neubiberg (DE)

( * ) Notice: Subject to any disclaimer, the term of this patent is extended or adjusted under 35 U.S.C. 154(b) by 379 days.

(21) Appl. No.: 17/843,322

(22) Filed: Jun. 17, 2022

(65) Prior Publication Data

US 2022/0404486 A1    Dec. 22, 2022

(30) Foreign Application Priority Data

Jun. 18, 2021   (EP) .................................. 21180394

(51) Int. Cl.
    *G01S 13/89*      (2006.01)

(52) U.S. Cl.
    CPC ................... *G01S 13/89* (2013.01)

(58) Field of Classification Search
    CPC ........ G01S 13/89; G01S 13/343; G01S 13/42; G01S 13/536; G01S 13/584; G01S 13/72; G01S 13/88; G01S 7/534; G01S 7/415; G01S 7/417; G06T 7/0002; G06T 2207/10044; G06T 2207/30196; G06T 2207/30242; G06N 3/08
    See application file for complete search history.

(56) References Cited

U.S. PATENT DOCUMENTS

| | | | |
|---|---|---|---|
| 7,692,684 B2 | 4/2010 | Ku et al. | |
| 10,795,012 B2* | 10/2020 | Santra | ..................... G06V 40/23 |
| 2003/0179127 A1* | 9/2003 | Wienand | .................. G07C 9/00 |
| | | | 342/28 |
| 2014/0355829 A1 | 12/2014 | Heu et al. | |
| 2016/0109566 A1 | 4/2016 | Liu et al. | |

(Continued)

FOREIGN PATENT DOCUMENTS

| | | | | |
|---|---|---|---|---|
| CN | 110118966 A | | 8/2019 | |
| CN | 111239728 A | * | 6/2020 | ........... G01S 13/426 |

(Continued)

OTHER PUBLICATIONS

3D_people_counting_demo_implementation_guide.pdf (Year: 2021).*

(Continued)

*Primary Examiner* — Olumide Ajibade Akonai
*Assistant Examiner* — Yonghong Li
(74) *Attorney, Agent, or Firm* — Slater Matsil, LLP

(57) ABSTRACT

In an embodiment, a method includes: obtaining one or more radar measurement frames, each one of the one or more radar measurement frames including respective data samples acquired by a radar sensor monitoring a scene; for each one of the one or more radar measurement frames, determining a respective 2-D angular intensity map of the scene based on the respective radar measurement frame; and performing a people counting operation based on the one or more 2-D angular intensity maps determined for the one or more radar measurement frames to determine a people count for the scene.

21 Claims, 22 Drawing Sheets

(56) References Cited

U.S. PATENT DOCUMENTS

| | | | |
|---|---|---|---|
| 2019/0178980 A1* | 6/2019 | Zhang | A61B 5/7267 |
| 2019/0377063 A1 | 12/2019 | Cho et al. | |
| 2020/0092742 A1* | 3/2020 | Lee | G06N 3/08 |
| 2020/0333449 A1 | 10/2020 | Cho et al. | |

FOREIGN PATENT DOCUMENTS

| | | | | |
|---|---|---|---|---|
| CN | 110118966 B | * | 10/2020 | G01S 13/88 |
| KR | 101582404 B1 | | 1/2016 | |
| KR | 101678373 B1 | | 11/2016 | |

OTHER PUBLICATIONS

CN111239728A_Description_20240723_1657.pdf translation of CN111239728A (Year: 2021).*

Long short-term memory—Wikipedia .pdf (Year: 2020).*

CN111239728_Fig3_translation.pdf (Year: 2021).*

CN111239728_Fig5_translation.pdf (Year: 2021).*

Tang_Occupancy_detection_and_people_counting_Using_radar.pdf (Year: 2020).*

CN110118966B_Description_20241217_1813.pdf -- translation of CN110118966B (Year: 2020).*

Chung, J. et al., "Empirical Evaluation of Gated Recurrent Neural Networks on Sequence Modeling," arXiv:1412.3555v1, Dec. 11, 2014, 9 pages.

Gers, F. et al., "Learning Precise Timing with LSTM Recurrent Networks," Journal of Machine Learning Research, Aug. 2, 2002, 29 pages.

Jagannatha, A. et al., "Bidirectional RNN for Medical Event Detection in Electronic Health Records," arXiv:1606.07953v2, Jul. 12, 2016, 10 pages.

Schubert, E. et al., "DBSCAN Revisited, Revisited: Why and How You Should (Still) Use Dbscan," ACM Transactions on Database Systems, vol. 42, No. 3, Article 19, Jul. 2017, 21 pages.

\* cited by examiner

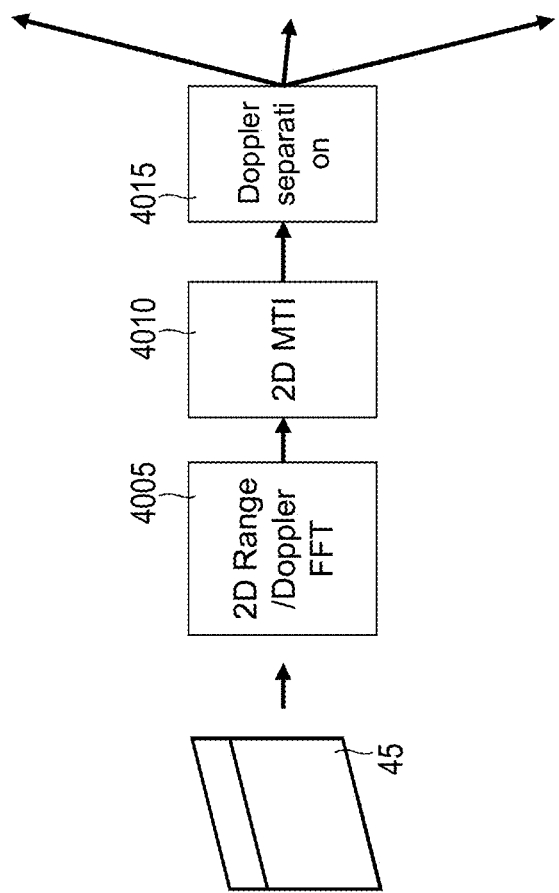

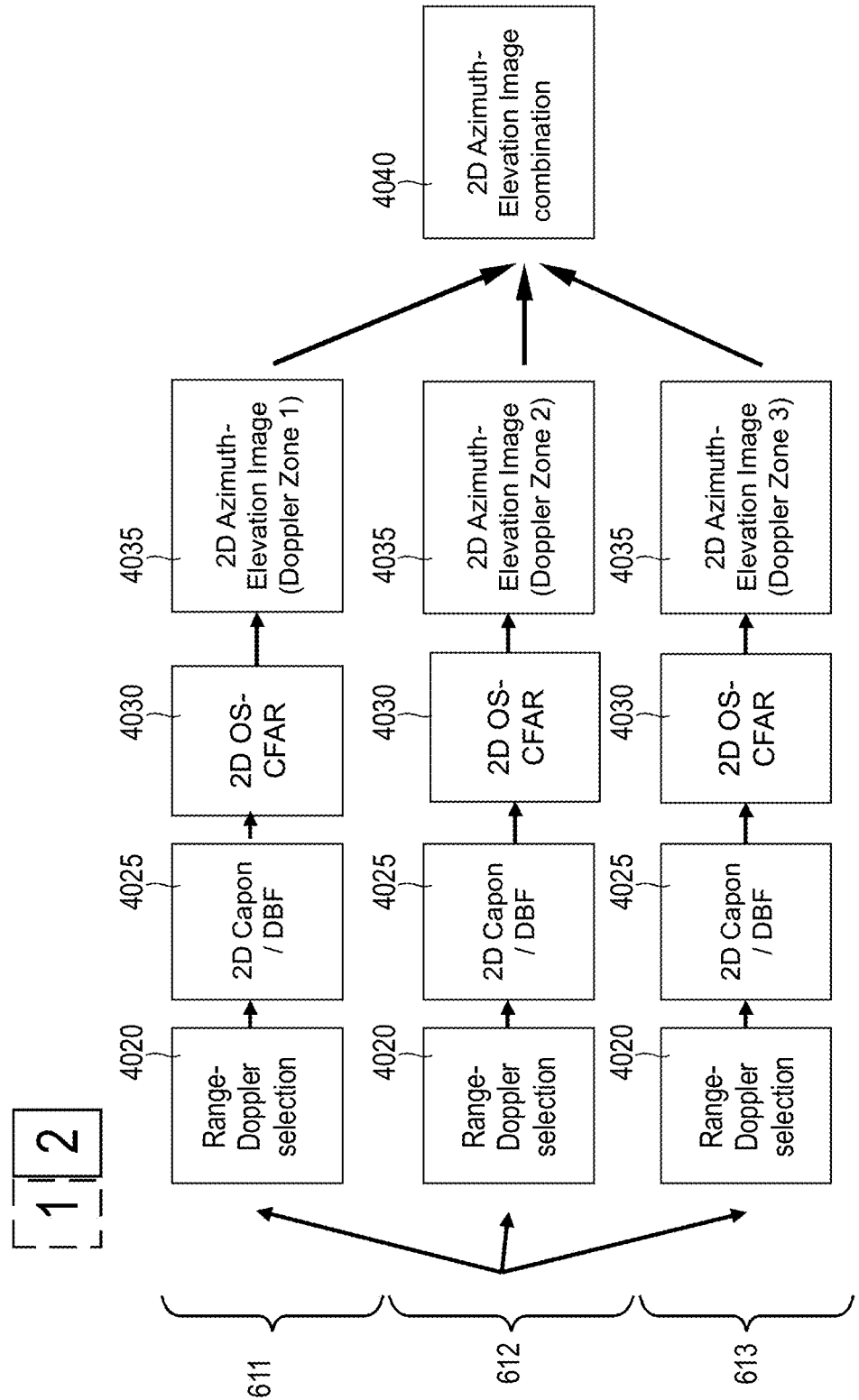

PEOPLE COUNTING BASED ON RADAR MEASUREMENT

CROSS-REFERENCE TO RELATED APPLICATIONS

This application claims the priority benefit of European Patent Application No. 21180394, filed on Jun. 18, 2021, which application is hereby incorporated herein by reference.

TECHNICAL FIELD

Various examples of the disclosure generally relate to people counting based on radar measurements.

BACKGROUND

People counting refers to determining a count of persons in a scene. The count of people in a scene monitored by a sensor is determined.

People counting is helpful in various use cases such as monitoring of entrances or accidents of a restricted area.

People counting based on images acquired using a camera is known. See U.S. Pat. No. 7,692,684B2, US20140355829A1, and US20160109566A1. Such techniques face certain restrictions. For instance, it has been observed that an accuracy of the people counting varies with lighting conditions.

Radar-based people counting can alleviate some of the above-identified restrictions and drawbacks. Reference techniques of radar-based people counting are known from: KR 10-2051855, KR 10-1582404, KR 10-1678373, and KR 10-1917313.

SUMMARY

There is a need for increased techniques of people counting. Specifically, there is a need for advanced techniques of people counting based on radar measurements.

This need is met, e.g., by the features of the independent claims. The features of the dependent claims define embodiments.

Hereinafter, techniques will be disclosed that facilitate people counting based on radar measurements. Using the disclosed techniques, it is possible to determine an accurate people count. A large number of people can be counted. It is possible to separate persons standing close by in the scene based on radar measurement data.

In some embodiments, people counting is implemented based on radar measurements. Specifically, a 2-D angular intensity map, e.g., an azimuthal-elevation map can be used. Further, Doppler frequency-shift bins can be created based on range-Doppler intensity maps to increase the degree of freedom in the people counting.

In accordance with an embodiment, a computer-implemented method includes obtaining one or more radar measurement frames. Each one of the one or more radar measurement frames includes respective data samples that are acquired by a radar sensor monitoring a scene. For each one of the one or more radar measurement frames, a respective 2-D angular intensity map of the scene is determined based on the radar measurement frame. A people counting operation is performed based on the one or more 2-D angular intensity maps determined for the one or more radar measurement frames, to determine a people count for the scene.

In accordance with an embodiment, a computer program or a computer-program product or a computer-readable storage medium includes program code. The program code can be loaded and executed by at least one processor. Upon loading and executing the program code, the at least one processor performs a computer-implemented method. The method includes obtaining one or more radar measurement frames. Each one of the one or more radar measurement frames includes respective data samples that are acquired by a radar sensor monitoring a scene. For each one of the one or more radar measurement frames, a respective 2-D angular intensity map of the scene is determined based on the radar measurement frame. A people counting operation is performed based on the one or more 2-D angular intensity maps determined for the one or more radar measurement frames, to determine a people count for the scene.

In accordance with an embodiment, a device includes at least one processor. The at least one processor can obtain one or more radar measurement frames. Each one of the one or more radar measurement frames includes respective data samples that are acquired by a radar sensor monitoring a scene. For each one of the one or more radar measurement frames, a respective 2-D angular intensity map of the scene is determined based on the radar measurement frame. The at least one processor is further configured to perform a people counting operation based on the one or more 2-D angular intensity maps determined for the one or more radar measurement frames, to determine a people count for the scene.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 8 schematically illustrates a processing pipeline for pre-processing radar measurement data according to various examples.

DETAILED DESCRIPTION OF ILLUSTRATIVE EMBODIMENTS

Figure 1:
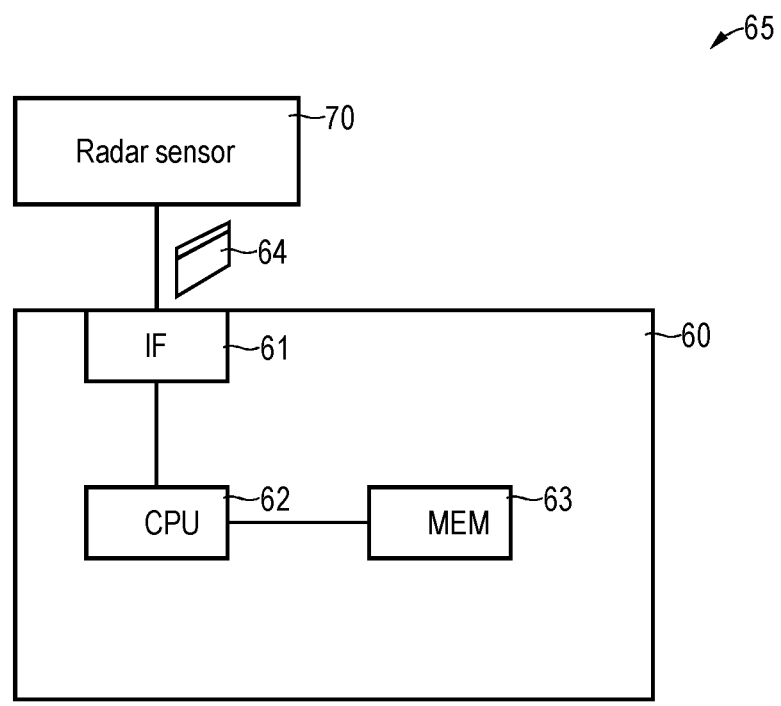
FIG. 1 schematically illustrates a system including a processing device and a radar sensor according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of people counting will be described. A people count specifies the number of persons in a scene.

According to various examples, a computer-implemented people counting operation operates based on measurement data of a radar measurement. For instance, a short-range radar measurement could be implemented. Here, radar chirps can be used to measure a position of one or more objects in a scene having extents of tens of centimeters or meters.

According to the various examples disclosed herein, a millimeter-wave radar sensor may be used to perform the radar measurement; the radar sensor operates as a frequency-modulated continuous-wave (FMCW) radar that includes a millimeter-wave radar sensor circuit, a transmitter, and a receiver. A millimeter-wave radar sensor may transmit and receive signals in the 20 GHz to 122 GHz range. Alternatively, frequencies outside of this range, such as frequencies between 1 GHz and 20 GHz, or frequencies between 122 GHz and 300 GHz, may also be used.

A radar sensor can transmit a plurality of radar pulses, such as chirps, towards a scene. This refers to a pulsed operation. In some embodiments the chirps are linear chirps, i.e., the instantaneous frequency of the chirps varies linearly with time.

A Doppler frequency shift can be used to determine a velocity of the target. Measurement data provided by the radar sensor can thus indicate depth positions of multiple objects of a scene. It would also be possible that velocities are indicated.

Compared to camera-based people counting, people counting based on radar measurements can have some advantages such as: invariant to illumination conditions; or preserving privacy.

According to various examples, a people-counting algorithm can be used to implement the people counting operation.

To obtain input data for the people-counting algorithm, raw samples of the radar measurement data can be preprocessed. As various types of people-counting algorithms are possible, also various kinds and types of input data can be used.

In particular, it is possible that a people counting (PC) operation is based on one or more 2-D angular intensity maps of the scene determined based on the radar measurement data. It would be possible, that the input data provided to the PC algorithm includes the 2-D angular intensity maps.

The 2-D angular intensity maps can resolve two angular dimensions, typically called elevation and azimuthal dimensions. The 2-D angular intensity maps correspond to an image-like 2-D representation of a signal intensity for different elevation angles and azimuthal angles. This means that a lateral resolution of objects in the scene can be provided. The contrast of the 2-D angular intensity maps may not or at least not directly encode the range or velocity of a respective object arranged at the corresponding lateral position.

The 2-D angular intensity maps can be determined by using a beamforming algorithm. For instance, a 2-D Capon spectral analysis can be implemented on a range-Doppler intensity map (RDI). The RDI, in turn, can be obtained by performing a 2-D Fast Fourier Transformation (FFT) of a radar measurement frame along a fast-time dimension and a slow-time dimension.

According to various examples, different types of PC algorithms can be used to implement a PC operation. Some types of PC algorithms are disclosed below in TAB. 1.

TABLE 1 various options of implementing the PC operation using respective PC algorithms. As a general rule, it would be possible to use multiple such options for the PC algorithms in parallel and then consolidate respective results.

| | People counting algorithm | Example details |
|---|---|---|
| I | Aggregated intensity | For instance, it would be possible to sum the intensity values of multiple pixels of a 2-D angular intensity map. Then, the respective aggregated intensity can be compared with multiple predefined thresholds, wherein each predefined threshold corresponds to a respective people count.<br>Such techniques may be, in particular, helpful in combination with static background subtraction. For instance, a maximum range threshold can be considered and only signals of shorter ranges can be considered.<br>Such techniques are based on the finding that for more (fewer) people in the scene, the overall signal intensity of backscattered electromagnetic waves can be higher (lower). |
| II | Un-supervised clustering | According to various examples, the people count is determined based on an unsupervised clustering algorithm that is used to detect spatial clusters of increased intensity in 2-D angular intensity maps. Then, these spatial clusters can be used to determine the people count. Each spatial cluster can be associated with a respective person.<br>An example of an unsupervised clustering algorithm is the DBSCAN algorithm. See, e.g., Schubert, Erich, et al. "DBSCAN revisited, revisited: why and how you should (still) use DBSCAN." *ACM Transactions on Database Systems (TODS)* 42.3 (2017): 1-21.<br>According to various examples, it would be possible that the unsupervised clustering algorithm is parametrized using one or counting metrics. Such counting metrics may define under what circumstances a cluster is detected.<br>Example counting metrics include a minimum spatial points per clusters, i.e., specifying how many pixels of the 2-D angular map are required to form a cluster. A further example counting metric includes the minimum spatial inter-class the distance. This can specify a minimum distance in the 2-D angular space that needs to be present between two independently detected clusters.<br>Yet a further counting metric would include the minimum integrated cluster intensity. Here, the sum of the intensity values of all pixels included in a candidate cluster can be calculated and compared against a predefined threshold. Only if the integrated cluster intensity exceeds this minimum integrated cluster intensity threshold, the cluster may be detected. |
| III | Neural network algorithm | According to various examples, it would be possible that the PC operation is implemented using one or machine-learned algorithms.<br>According to various examples, would be possible that a neural network algorithm (NN) is used. |

TABLE 1-continued various options of implementing the PC operation using respective PC algorithms. As a general rule, it would be possible to use multiple such options for the PC algorithms in parallel and then consolidate respective results.

| People counting algorithm | Example details |
|---|---|
| | An NN generally includes a plurality of nodes that can be arranged in multiple layers. Nodes of given layer are connected with one or more nodes of a subsequent layer. Skip connections between non-adjacent layers are also possible. Generally, connections are also referred to as edges. The output of each node can be computed based on the values of each one of the one or more nodes connected to the input. Nonlinear calculations are possible. Different layers can perform different transformations such as, e.g., pooling, max-pooling, weighted or unweighted summing, non-linear activation, convolution, etc. The NN can include multiple hidden layers, arranged between an input layer and an output layer.<br>The calculation performed by the nodes are set by respective weights associated with the nodes. The weights can be determined in a training of the NN. For this, a numerical optimization can be used to set the weights. A loss function can be defined between an output of the NN in its current training can then minimize the loss function. For this, a gradient descent technique may be employed where weights are adjusted from back-to-front of the NN.<br>There can be a spatial contraction and a spatial expansion implemented by one or more encoder branches and one or more decoder branches, respectively. I.e., the x-y-resolution of the input data and the output data may be decreased (increased) from layer to layer along the one or more encoder branches (decoder branches). The encoder branch provides a contraction of the input data, and the decoder branch provides an expansion.<br>At the same time, feature channels can increase and decrease along the one or more encoder branches and the one or more decoder branches, respectively. The one or more encoder branches and the one or more decoder branches are connected via a bottleneck. |

Next, details with respect to a possible implementation of the NN according to TAB. 1: example III will be provided.

According to various examples, it would be possible that a NN is used that includes multiple temporal input channels. This means that different temporal input channels can be associated with different points in time. Here, it would be possible that, for each temporal input channel, a respective 2-D angular intensity map is provided as an input. The different 2-D angular intensity maps can be based on radar measurement frames that have been acquired in subsequent sampling durations. Thus, a time sequence of 2-D angular intensity maps can be determined based on a time sequence of radar measurement frames. Thereby, a temporal dynamic of the presence or absence of people in the count of people in the scene can be captured. By capturing such temporal dynamic using a NN that has multiple temporal input channels, it is possible to obtain more accurate results for the people count. In particular, inter-dependencies between information included in subsequent radar measurement frames can be considered. Thereby, sudden, artificial changes of the people count can be avoided that can otherwise be observed when considering 2-D angular intensity maps determined based on a single radar measurement frame in isolation.

There are various kinds and types of NNs known that can provide for multiple input temporal channels. Examples include recurrent neural network (RNN) or a temporal convolutional network.

There are various implementations of RNNs known in the prior art and it is possible to use such RNNs in the various examples described herein. For instance, the RNN could be selected from the group consisting of: a Long Short Term Memory (LSTM) RNN, a Gated Recurrent Unit (GRU) RNN, and a bidirectional RNN, an autoregressive RNN with a Transformer encoder-decoder.

The LSTM RNN has feedback connections between its cells. For instance, the cell of an LSTM RNN can remember values over certain time intervals. A forget gate can be defined that deletes data. An example of the LSTM RRN is described in: Gers, Felix A., Nicol N. Schraudolph, and Jürgen Schmidhuber. "Learning precise timing with LSTM recurrent networks." *Journal of machine learning research* 3. August (2002): 115-143.

An example of the GRU RNN is described in Chung, Junyoung, et al. "Empirical evaluation of gated recurrent NNs on sequence modeling." *arXiv preprint arXiv:* 1412.3555 (2014). The GRU RNN does not require memory cells as the LSTM RNN.

Bidirectional RNNs are described in Jagannatha, Abhyuday N., and Hong Yu. "Bidirectional RNN for medical event detection in electronic health records." *Proceedings of the conference. Association for Computational Linguistics. North American Chapter. Meeting.* Vol. 2016. NIH Public Access, 2016.

According to some examples, it would even be possible that multiple NNs are used to implement the PC operation. For instance, it would be possible to use two or more NNs in sequence. For instance, a first NN may be an auto-encoder NN. The auto-encoder neural network, as a general rule, includes an encoder branch and a decoder branch that are sequentially arranged and connected via a bottleneck. Away from the input layer and the output layer and specifically at the bottleneck, latent feature representations are obtained in the form of a latent feature vector. The feature vector can specify the presence or absence of certain features. The feature vector thus can be seen as a compressed form of the input. Generally, for the auto-encoder NN, based on the feature embedding, using the decoder branch, the aim is to re-construct the input. Thus, a loss function can be defined during training of the auto-encoder NN that penalizes differences between the input and the output. Accordingly, it is possible to train the auto-encoder NN using unsupervised learning.

Then, the latent feature vector of the autoencoder NN can be used as an input to a subsequent second NN, e.g., a NN that has multiple time input channels. I.e., the latent feature vector determined for multiple 2-D angular intensity maps associated with different points in time can be provided as inputs to the multiple time input channels of the second neural network.

As will be appreciated from the above, various implementations of the PC operation and, in particular, the PC algorithm are possible.

FIG. 1 schematically illustrates a system 65. The system 65 includes a radar sensor 70 and a processing device 60. The processing device 60 can obtain measurement data 64 from the radar sensor 70. The processor 62 can receive the measurement data 64 via an interface 61 and process the measurement data 64. For instance, the measurement data 64 could include radar measurement frames including samples of an ADC converter. It would also be possible that further pre-processing is implemented at the radar sensor 70; for instance, the radar sensor 70 could output 2-D angular intensity maps such as azimuth-elevation intensity maps.

The processor 62 can load program code from a memory 63 and execute the program code. The processor 62 can then perform techniques as disclosed herein, e.g., pre-processing measurement data 64, performing a PC operation, etc.

Figure 2:
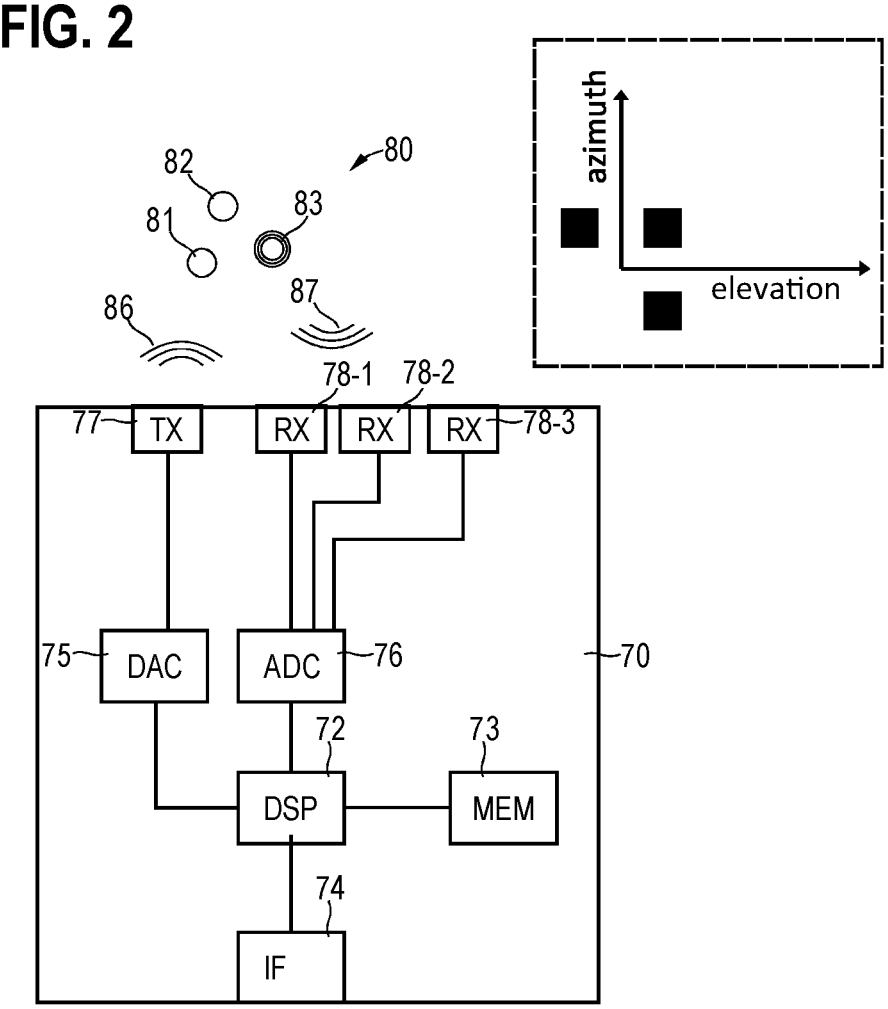
FIG. 2 illustrates details of the radar sensor according to various examples.

FIG. 2 illustrates aspects with respect to the radar sensor 70. The radar sensor 70 includes a processor 72 (labeled digital signal processor, DSP) that is coupled with a memory 73. Based on program code that is stored in the memory 73, the processor 72 can perform various functions with respect to transmitting radar pulses 86 using a transmit antenna 77 and a digital-to-analog converter (DAC) 75. Once the radar pulses 86 have been reflected by a scene 80, respective reflected radar pulses 87 can be detected by the processor 72 using an ADC 76 and multiple receive antenna 78-1, 78-2, 78-3 (e.g., ordered in a L-shape with half a wavelength distance; see inset of FIG. 2). The processor 72 can process raw data samples obtained from the ADC 76 to some larger or smaller degree. For instance, radar measurement frames could be determined and output. Also, 2-D angle intensity maps may be determined.

The radar measurement can be implemented a basic frequency-modulated continuous wave (FMCW) principle. A frequency chirp can be used to implement the radar pulse 86. A frequency of the chirp can be adjusted between a frequency range of 57 GHz to 64 GHz. The transmitted signal is backscattered and with a time delay corresponding to the distance of the reflecting object captured by all three receiving antennas. The received signal is then mixed with the transmitted signal and afterwards low pass filtered to obtain the intermediate signal. This signal is of significant lower frequency as the transmitted signal and therefore the sampling rate of the ADC 76 can be reduced accordingly. The ADC may work with a sampling frequency of 2 MHz and a 12-bit accuracy.

Figure 3:
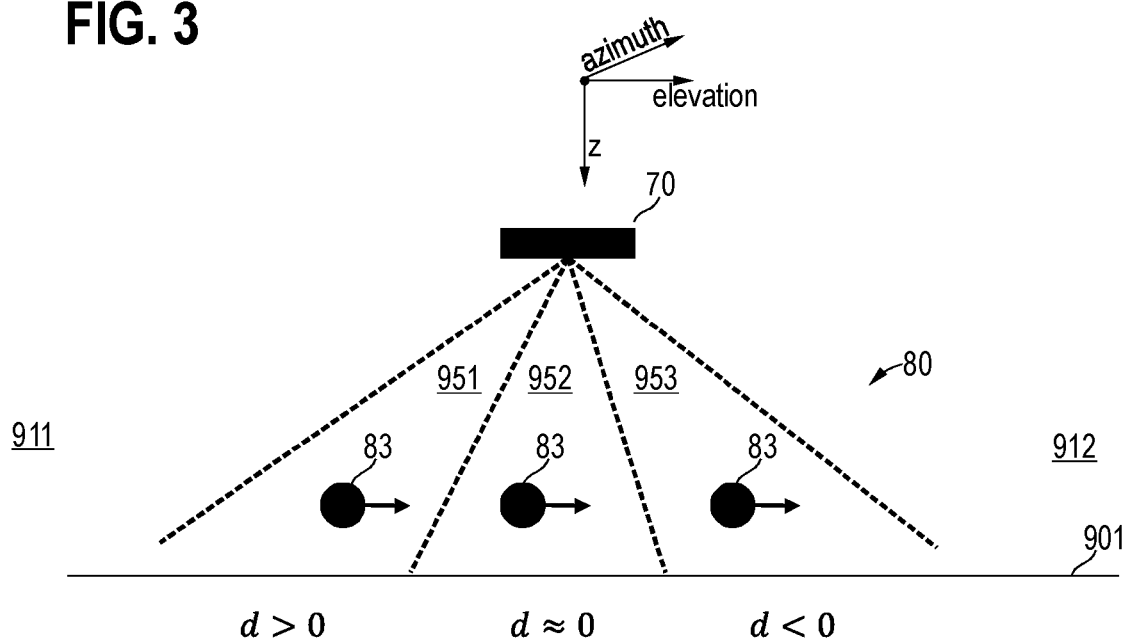
FIG. 3 schematically illustrates an overhead-mounting of the radar sensor for people counting according to various examples.

FIG. 3 schematically illustrates aspects with respect to an arrangement of the radar sensor 70 in the scene 80. FIG. 3 illustrates a scenario in which the radar sensor 70 is over-head-mounted. I.e., the radar sensor 70 faces, in z-direction, the ground 901. Illustrated is a person 83 moving along the ground 901, from an entrance 911 to an exit 912.

The radar sensor 70 is sensitive to radial velocity. Accordingly, the Doppler frequency shift d observed as the person 83 moves throughout the scene 80 from the entrance 911 towards the exit 912 will vary from positive values in a Doppler frequency-shift regime 951—to values around 0 in a respective Doppler frequency-shift regime 952—to values below 0 in a further respective Doppler frequency-shift regime 953.

According to various examples, this finding is utilized to provide more accurate people counting. In particular, it would be possible to partition the measurement data 64 to include data associated with each one of the Doppler frequency-shift regimes 951-953. Respective Doppler frequency-shift bins can be determined.

In particular, it is possible to separate people in the scene 80 depending on the Doppler frequency shift, as illustrated in FIG. 3. For instance, if the count of Doppler frequency-shift bins is given by M, then the respective degree of freedom in the position of the persons in the scene that can still be resolved is also M.

Further, beamforming can be utilized to distinguish in a further dimension that is independent of the Doppler-frequency shift dimension. Beamforming can provide the resolution along azimuth and elevation dimension. For example, considering the 2-D angular intensity map of the scene 80 obtained from beamforming, depending on the count of RX antennas 78-1-78-3, (cf. FIG. 2), denoted by N, a respective further degree of freedom in the position of the persons in the scene can be resolved.

As will be explained below, the techniques described herein it is possible to determine a people count that is larger than N. This is achieved by separating persons also in Doppler domain. Specifically, a people count of up to M×(N−1) can be determined. For instance, for 3 antennas and 3 Doppler regimes, up to 3×2=6 persons can be counted. Next, details with respect to such people counting will be explained in connection with FIG. 4.

Figure 4:
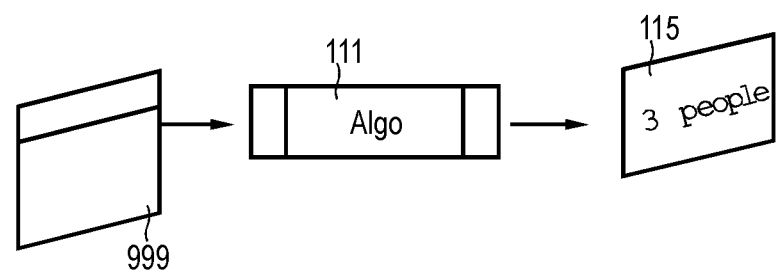
FIG. 4 schematically illustrates a processing pipeline for people counting based on input data that is determined based on radar measurement data according to various examples.

FIG. 4 schematically illustrates a processing pipeline for implementing people counting. The processing pipeline of FIG. 4 could be implemented, e.g., by the processor 62 of the processing device 60 (cf. FIG. 1).

Input data 999—based on the measurement data 64—is provided to a PC algorithm 11. The PC algorithm 11 outputs a label that is indicative of the people count 115 included in the scene.

As a general rule, the input data 999 can include one or more 2-D angular intensity maps of the scene 80.

Various examples of implementing the PC algorithm 11 have been explained above in connection with TAB. 1.

Figure 5:
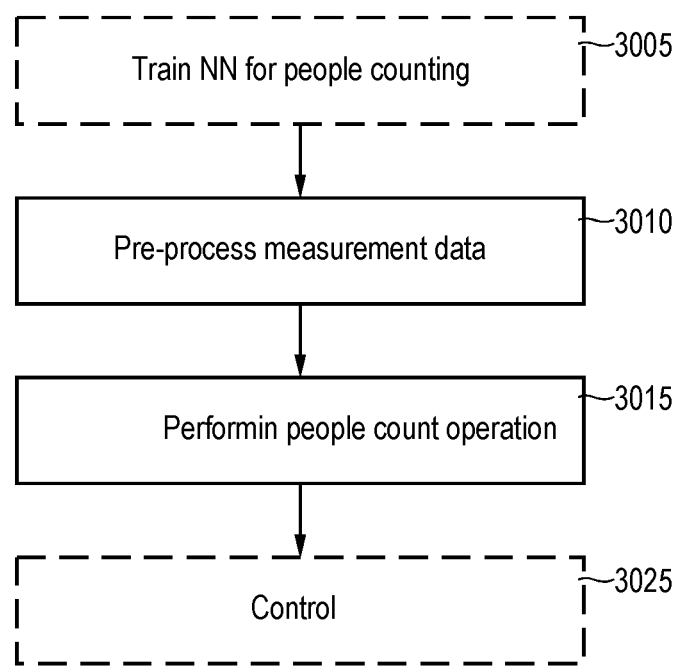
FIG. 5 is a flowchart of a method according to various examples.

FIG. 5 is a flowchart of a method according to various examples. The method of FIG. 5 enables people counting of persons in the scene. The method of FIG. 5 could implement the processing pipeline illustrated in FIG. 4. Optional boxes are labeled in dashed lines in FIG. 5. For instance, the method of FIG. 5 could be implemented by a processing device or more specifically by a processor upon loading program code from a memory and executing the program code. For instance, the method of FIG. 5 could be executed, at least partly, by the processor 62 of the processing device 60 upon loading program code from the memory 63. Further, at least parts of the method of FIG. 5 could be executed by the processor 72 of the radar sensor 70. Specifically, it would be possible that part of the pre-processing of the raw data is implemented by the processor 72 of the radar sensor 70.

At optional box 3005, a NN that can be used for implementing a PC operation can be trained. The NN can receive, as input data, one or more 2-D angular intensity maps.

Training of the respective PC algorithm is not required in all scenarios. For instance, for an unsupervised clustering algorithm—cf. TAB. 1: example II—training may not be required.

However, for scenarios where training is required, multiple sets of training input data—corresponding to the input data 999—may be provided to the PC algorithm 11 and the respective prediction of the people count can be compared against the ground truth for each one of the multiple sets of training input data. For instance, the ground truth can include respective labels indicative of the count of people in the scene. Manual annotation of such ground truth labels is possible. Then, a gradient-descent optimization can be used to adjust the weights of the NN implementing the PC algorithm 111. Back propagation can be used.

Figure 6:
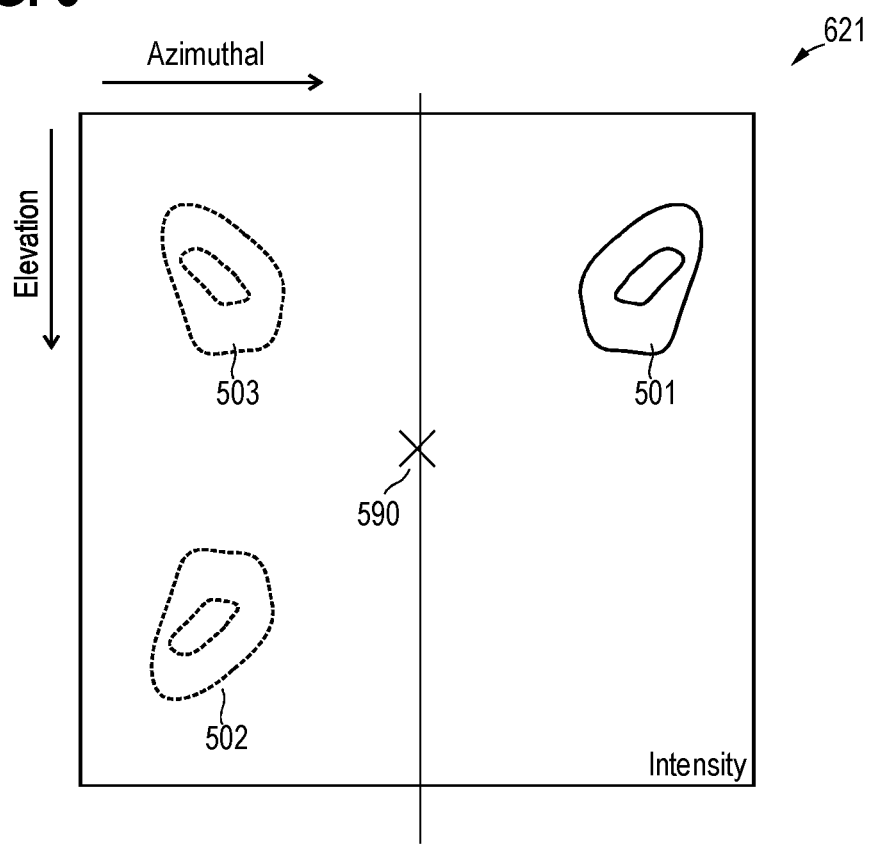
FIG. 6 schematically illustrates augmentation of a 2-D angular intensity map for creating training data for a neuro-network algorithm implementing a people-counting algorithm according to various examples.

It is generally helpful to obtain many training data sets. To extend the number of training data sets, it would be possible to augment existing training data sets to obtain new training data sets. To obtain new training data sets, various options for such augmentation are conceivable. For instance, noise could be added. Further, prior knowledge on a symmetry considerations can be exploited. For instance, as illustrated in FIG. 6, a 2-D angular intensity map 621 can include an intensity peak 501 at a certain elevation and azimuthal angle.

Then, it would be possible to mirror the peak 501 at the center 590 in elevation—azimuthal space, to obtain the peak 502. A further augmentation would pertain to mirroring the peak 501 at 0° azimuthal angle, to obtain the peak 503. Likewise, it would be possible to mirror at 0° elevation angle.

Once—where applicable—the people-counting algorithm 11 has been trained, the method commences with prediction of the people account. For this, at box 3010, the measurement data 64 is pre-processed. The pre-processing yields a 2-D angular intensity map. This can be used as the input data 999 to the PC algorithm.

The PC operation is executed at box 3015. The PC operation is based on one or more 2-D angular intensity maps that are determined for multiple radar measurement frames. Thereby, a people count can be determined for the scene.

Executing the PC operation at box 3015 can include executing, one or multiple times, the PC algorithm. For instance, the PC algorithm may be executed multiple times for multiple 2-D angular intensity maps obtained for different points in times. Then a result of such multiple executions can be consolidated. Executing the PC operation at box 3015 can also include applying a smoothing to a time dependency of the people count determined by the PC algorithm. Executing the PC operation at box 3015 can also include, e.g., executing a tracking operation to track positions of persons in the scene to provide a further input data to the PC algorithm.

Once the people count has been determined at box 3015, at box 3025, use-case specific applications can be executed. For instance, access to a restricted area could be controlled based on the people count.

Next, further details will be explained in connection with the pre-processing of the measurement data at box 3010. An example implementation will be explained in connection with FIG. 8, and FIG. 7 illustrates the data structure input to such processing.

Figure 7:
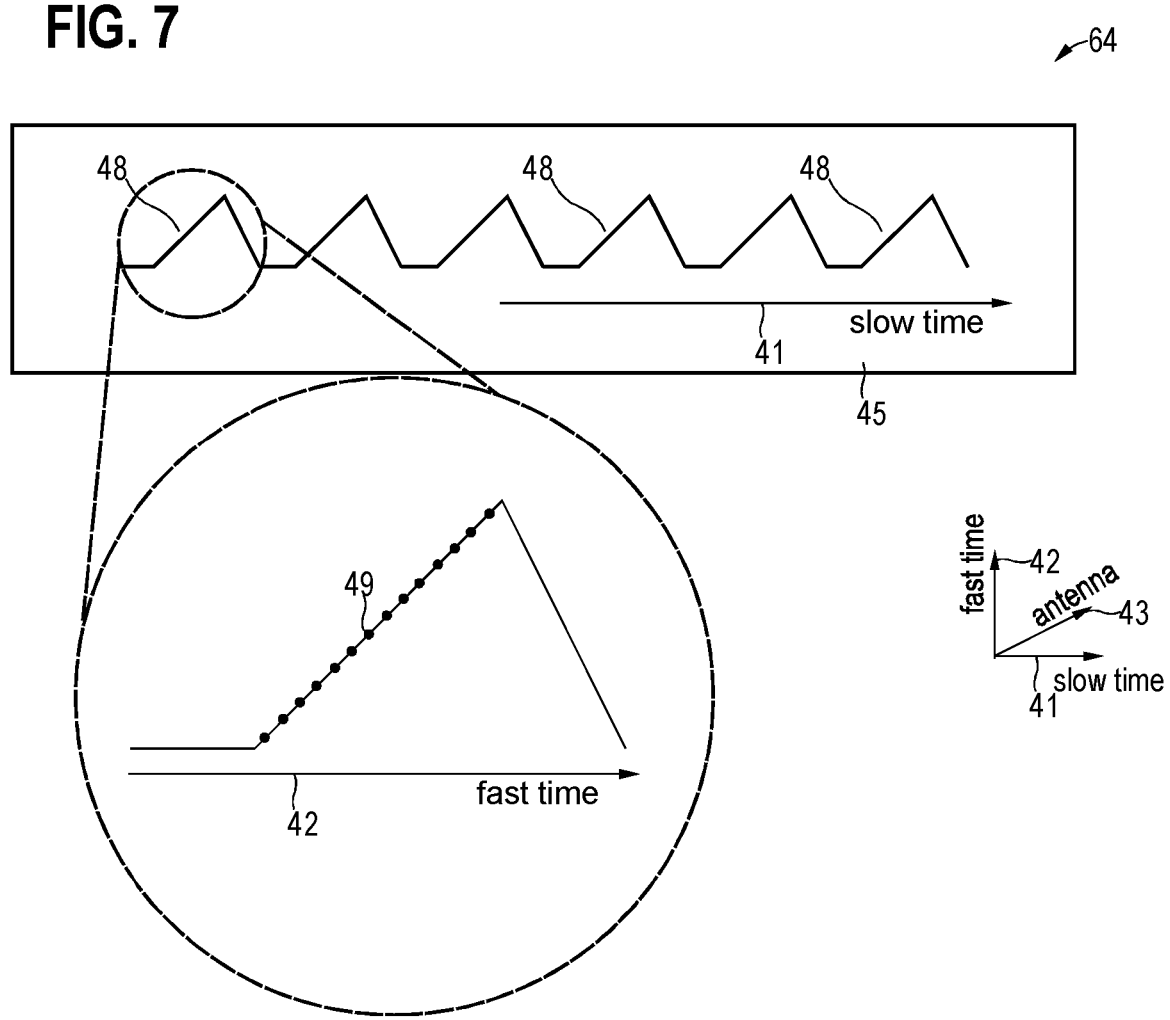
FIG. 7 schematically illustrates a radar measurement frame including data samples of a radar measurement according to various examples.

FIG. 7 schematically illustrates aspects with respect to the measurement data 64. FIG. 7 schematically illustrates a structure of raw data in form of a radar measurement frame 45.

Typically, a radar measurement frame 45 is defined by arranging data samples 49 obtained as raw data from the ADC (as explained in connection with FIG. 2) with respect to a fast-time dimension 42 and a slow-time dimension 41. A position along the fast time dimension 42 is incremented for each subsequent readout from the ADC (this is illustrated in the circular inset in FIG. 9), whereas a position along the slow time dimension 41 is incremented with respect to subsequent radar chirps 48. There can be an additional dimension which is the antenna dimension 43 (not illustrated in FIG. 9), which provides angular resolution based on beamforming. For instance, in FIG. 2, an example with three receive channels has been discussed.

The duration of the radar measurement frames 45 is typically defined by a measurement protocol is configured to generate 32 chirps within a radar measurement frame 45. The chirps repetition time is set to $T_{PRT}=0.39$ ms, which results in a maximum resolve Doppler velocity of $v_{max}=3.25$ ms$^{-1}$. The frequency of the chirps may range from $f_{min}=58$ GHz to $f_{max}$ 0 63 GHz and therefore covers a bandwidth of B=5 GHz. Hence, the range resolution is $\Delta r=3.0$ cm. Each chirp is sampled 64 times with a sampling frequency of 2 MHz resulting in a total observable range of $R_{max}=0.96$ m. Typically, the frame repetition frequency may be set to 30 frames per second.

FIG. 8 schematically illustrates a processing pipeline for pre-processing radar measurement data. In particular, a radar measurement frame such as the radar measurement frame 45 illustrated in connection with FIG. 7 can be pre-processed. The processing of FIG. 8 can be implemented as part of box 3010 of the method of FIG. 5. For instance, the preprocessing of FIG. 8 could be executed, at least in parts, by the processor 62 of the processing device 60. In some examples, it would also be possible that at least parts of the pre-processing of FIG. 8 are executed by the processor 72 of the radar sensor 70.

The radar measurement frame 45 serves as input. Then, at box 4005, a 2-D FFT of the radar measurement frame 45 along the slow-time dimension 41 and the fast-time dimension 42 is performed, to thereby obtain an RDI. Optionally, at box 4010, a moving target indication can be implemented to filter out clutter. The RDI 601 is illustrated in FIG. 9.

Figure 9:
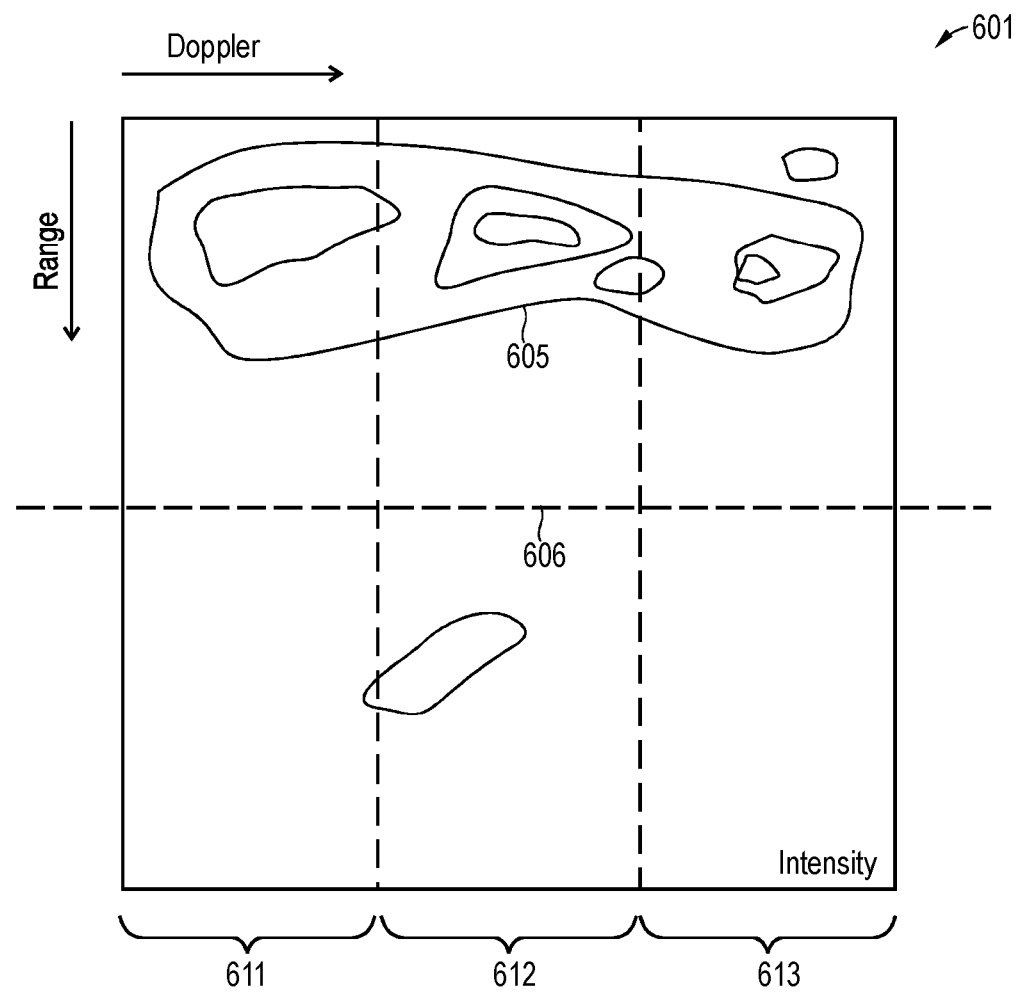
FIG. 9 is a contour plot of a range-Doppler intensity map according to various examples.

FIG. 9 is a contour plot of the intensity of the respective contributions in the raw data samples 49 corresponding to the range-Doppler positions. A multi-peak structure 605 is indicated.

Figure 10:
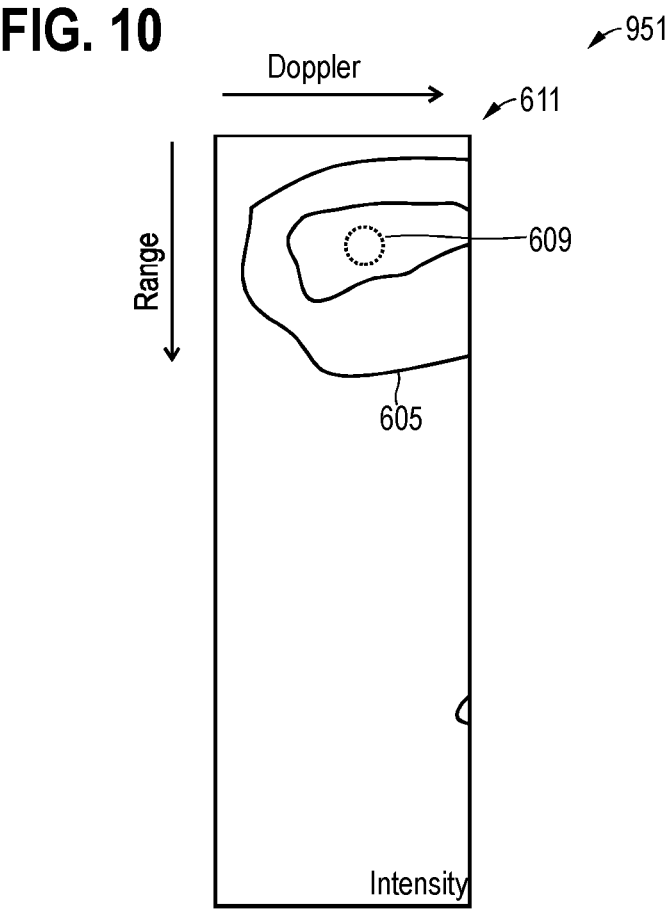
FIG. 10 is a contour plot of a first Doppler frequency-shift bin of the range-Doppler intensity map of FIG. 9 according to various examples.
Figure 11:
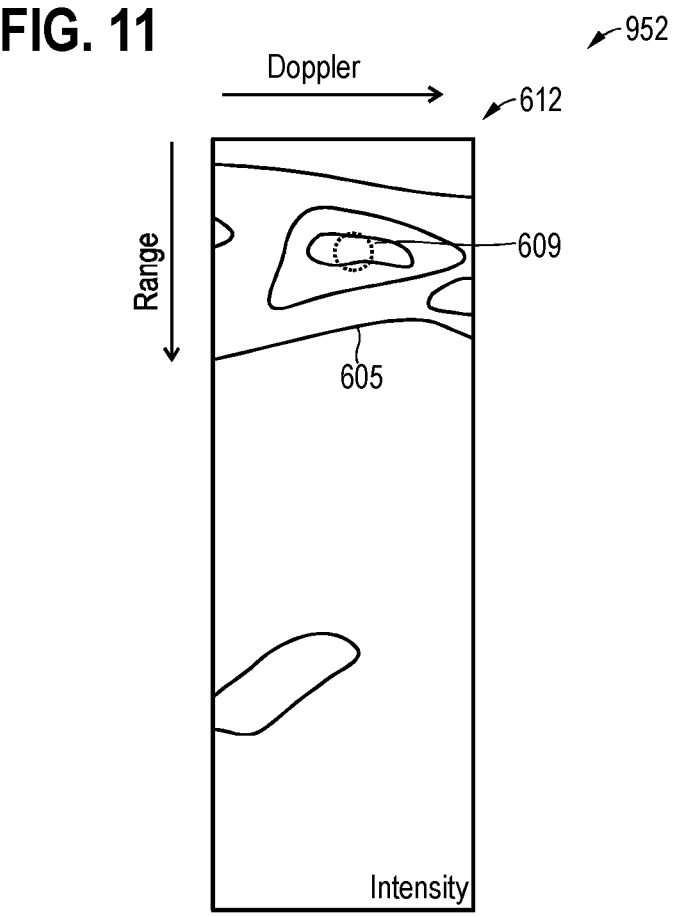
FIG. 11 is a contour plot of a second Doppler frequency-shift bin of the range-Doppler intensity map of FIG. 9 according to various examples.
Figure 12:
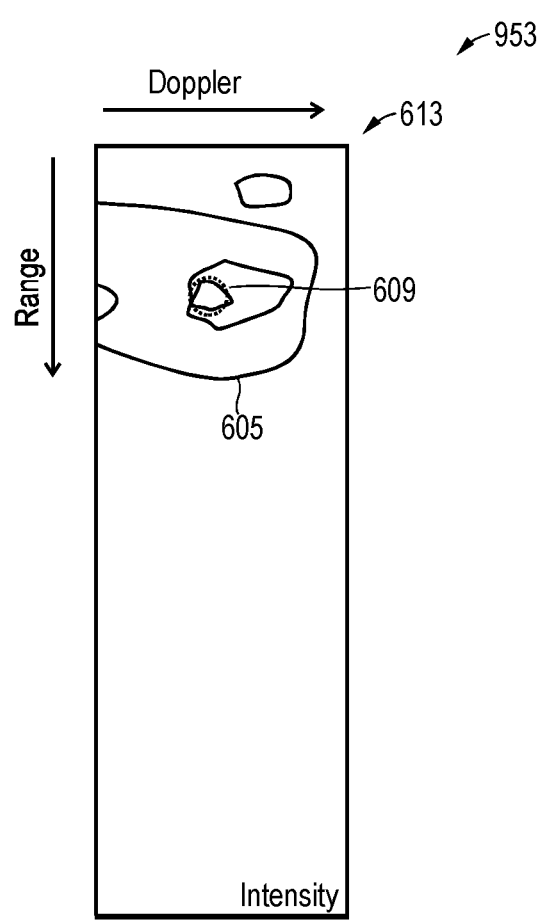
FIG. 12 is a contour plot of a third Doppler frequency-shift bin of the range-Doppler intensity map of FIG. 9 according to various examples.

Referring again to FIG. 8, at box 4015, multiple Doppler frequency-shift bins are determined for the RDI 601. This could be labeled as determining RDI segments. For instance, 3 Doppler frequency-shift bins 611-613 could be determined, as illustrated in FIG. FIG. 9, as well as in each one of FIG. 10, FIG. 11, and FIG. 12. These Doppler frequency-shift bins 611-613 correspond to the Doppler frequency-shift regimes 951-953 discussed in connection with FIG. 3.

It is then possible—at boxes 4020—to select, for each Doppler frequency-shift bin 611-613, a respective range-Doppler position 609. For instance, the range-Doppler position 609 (cf. FIGS. 10-12) can be selected based on the maximum signal level in the respective Doppler frequency-shift bin 611-613. Furthermore, it would be possible to ignore signal levels beyond a predefined range threshold 606 (cf. FIG. 9).

Next, at boxes 4025, for each selected range-Doppler position 609, digital beamforming can be implemented, optionally followed—at boxes 4030—by filtering such as a constant-false alarm rate filtering.

Figure 13:
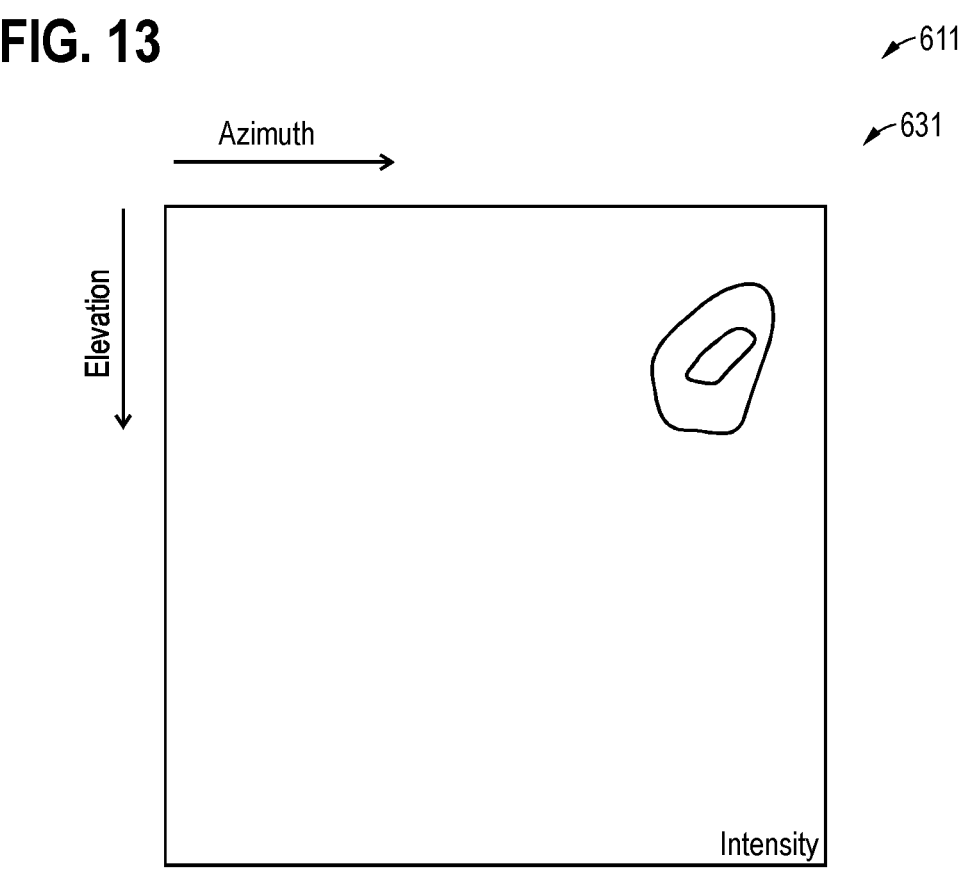
FIG. 13 is a contour plot of a 2-D angular partial intensity map determined based on the Doppler frequency-shift bin of FIG. 10 according to various examples.
Figure 14:
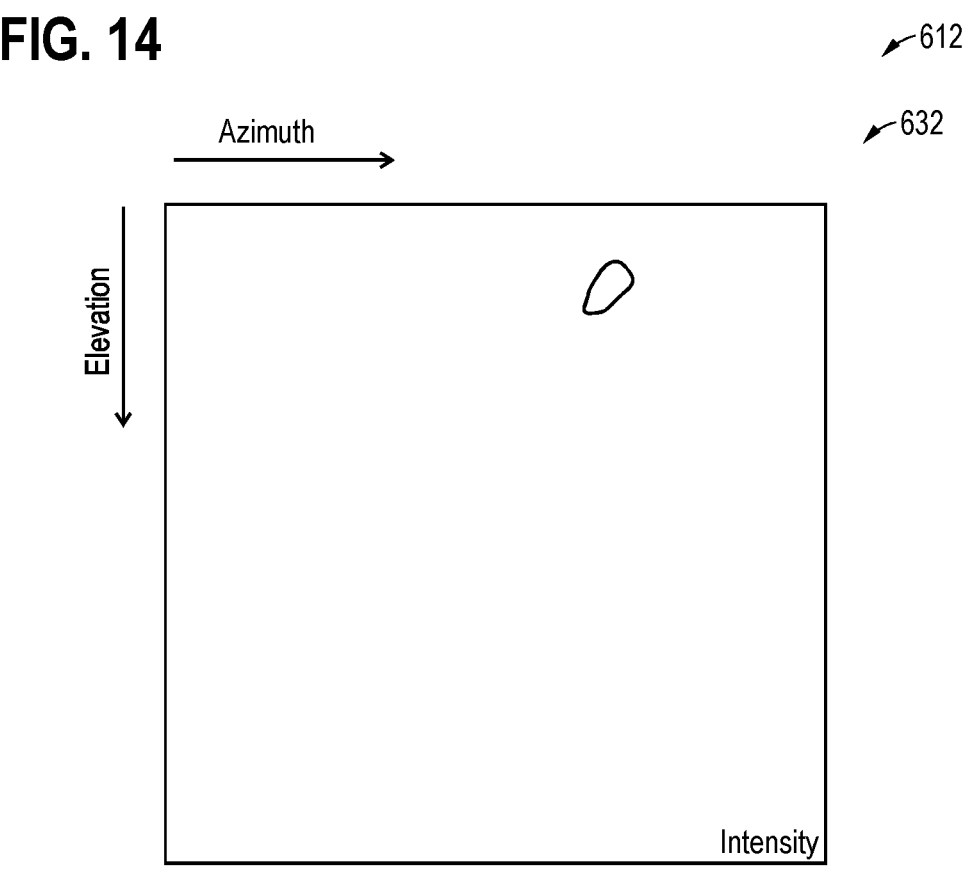
FIG. 14 is a contour plot of a 2-D angular partial intensity map determined based on the Doppler frequency-shift bin of FIG. 11 according to various examples.
Figure 15:
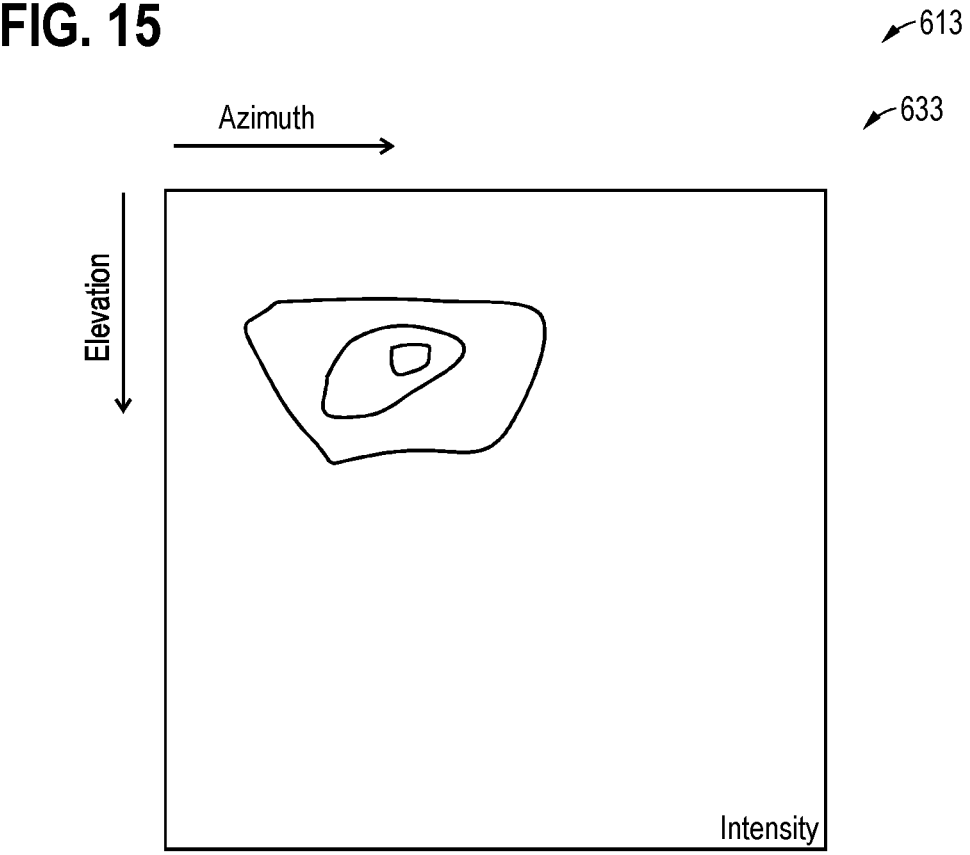
FIG. 15 is a contour plot of a 2-D angular partial intensity map determined based on a Doppler frequency-shift bin of FIG. 12 according to various examples.

From this, at boxes 4035, multiple 2-D angular partial intensity maps 631-633 are obtained, as illustrated in FIGS. 13, 14, and 15: The 2-D angular partial intensity map 631 of FIG. 13 corresponds to the Doppler frequency-shift bin 611; The 2-D angular partial intensity map 632 of FIG. 13 corresponds to the Doppler frequency-shift bin 612; The 2-D angular partial intensity map 633 of FIG. 13 corresponds to the Doppler frequency-shift bin 613.

By determining individual 2-D angular partial intensity maps 631-633, it is possible to increase the degrees of freedom for people detection—this is achieved by separating the people counting in Doppler domain, as also discussed in connection with FIG. 3.

Figure 16:
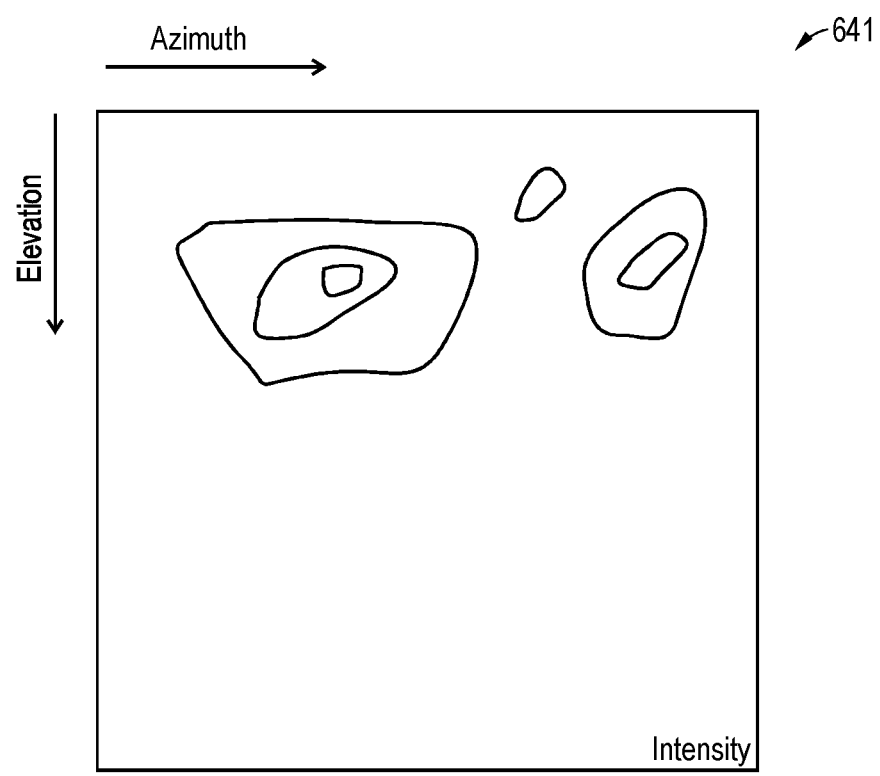
FIG. 16 is a contour plot of a combination of the 2-D angular partial intensity maps of FIG. 13, FIG. 14, and FIG. 15.

It is then possible to combine the multiple 2-D angular partial intensity maps 631-633 at box 4040. For instance, a summation could be used. The 2-D angular intensity map 641 obtained after combination is illustrated in FIG. 16.

Based on this 2-D angular intensity map 641, the people counting operating can be implemented. The PC operation can be based on the people-counting algorithm 11, as discussed in connection with FIG. 4. Further details with respect to the PC operation are illustrated in FIG. 17.

Figure 17:
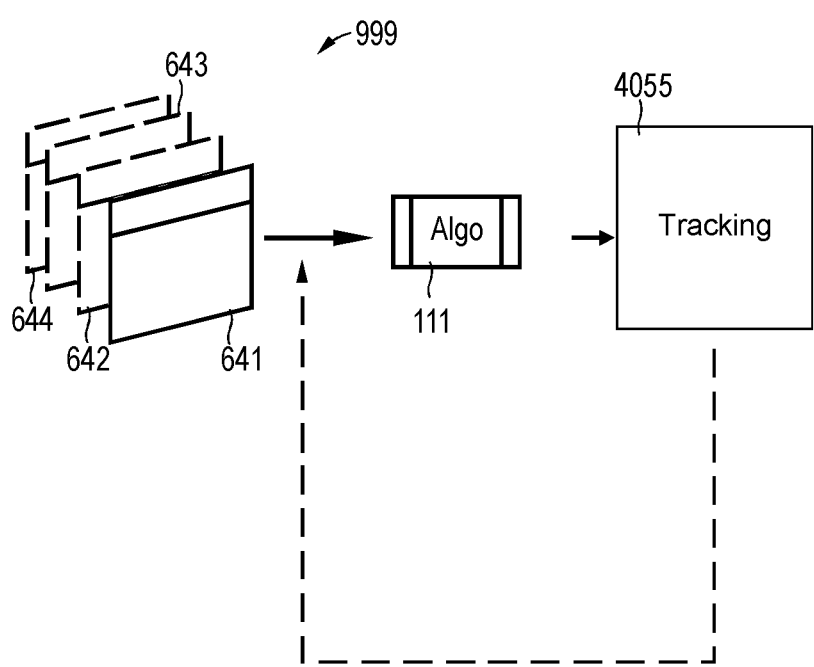
FIG. 17 schematically illustrates a processing pipeline for determining a people count based on the preprocessed radar measurement data.

FIG. 17 illustrates a processing pipeline for implementing people counting operation. FIG. 17 generally corresponds to FIG. 4, but illustrates people counting in further detail.

As illustrated in FIG. 17, the input data 999 to the PC algorithm 11 includes one or more 2-D angular intensity maps 641-644. For instance, a single 2-D angular intensity map 641 may be used as input to the PC algorithm 11. In further examples, it would be possible that multiple 2-D angular intensity maps 641-644 are provided as the input data 999 as an input to the PC algorithm 111.

Here, the multiple 2-D angular intensity map 641-644 can correspond to a time series. I.e., different 2-D angular intensity maps 641-644 can be determined based on different radar measurement frames 45, i.e., a time series of radar measurement frames 45.

For instance, a count of the 2-D angular intensity maps 641-644 of such time series (corresponding to the duration of the time series) provided as the input data 999 could be determined in accordance with typical length-of-stay of persons in the scene 80.

Each one of the 2-D angular intensity maps 641-644 can be obtained from respective processing in accordance with FIG. 8 and as explained in connection with box 3010.

Figure 18:
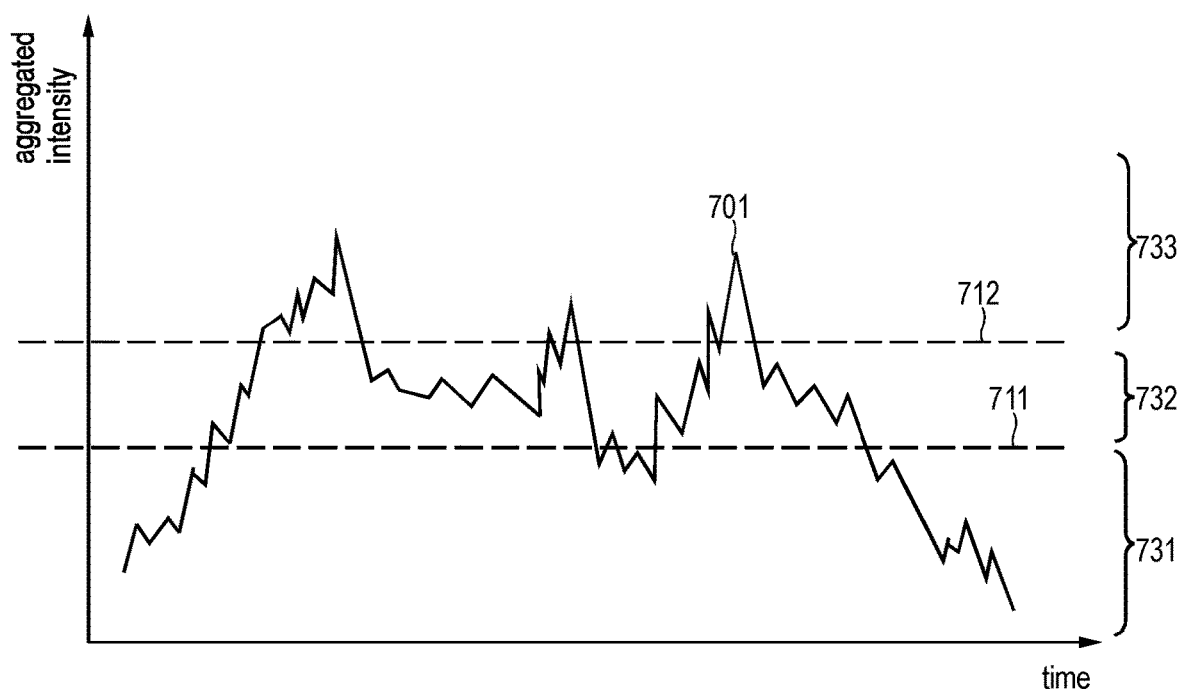
FIG. 18 schematically illustrates aspects with respect to an example implementation of a people-counting algorithm that is based on an aggregated intensity of pixels of 2-D angular intensity maps.

As previously discussed in connection with TAB. 1, there are multiple options available for implementing the PC algorithm 111. For instance, FIG. 18 illustrates a scenario according to TAB. 1, example I. Here, the sum of the intensity values of a single 2-D angular intensity map 641-644, i.e., the aggregated intensity 701, is compared against multiple thresholds 711, 712. These thresholds 711-712 define different regimes 731-733. For instance, if the aggregated intensity 701 is within the regime 732, this can be determined to correspond to the two persons present in the scene 80. When the aggregated intensity 701 is in the regime 733, this can correspond to three persons present in the scene 80, and so on.

Figure 19:
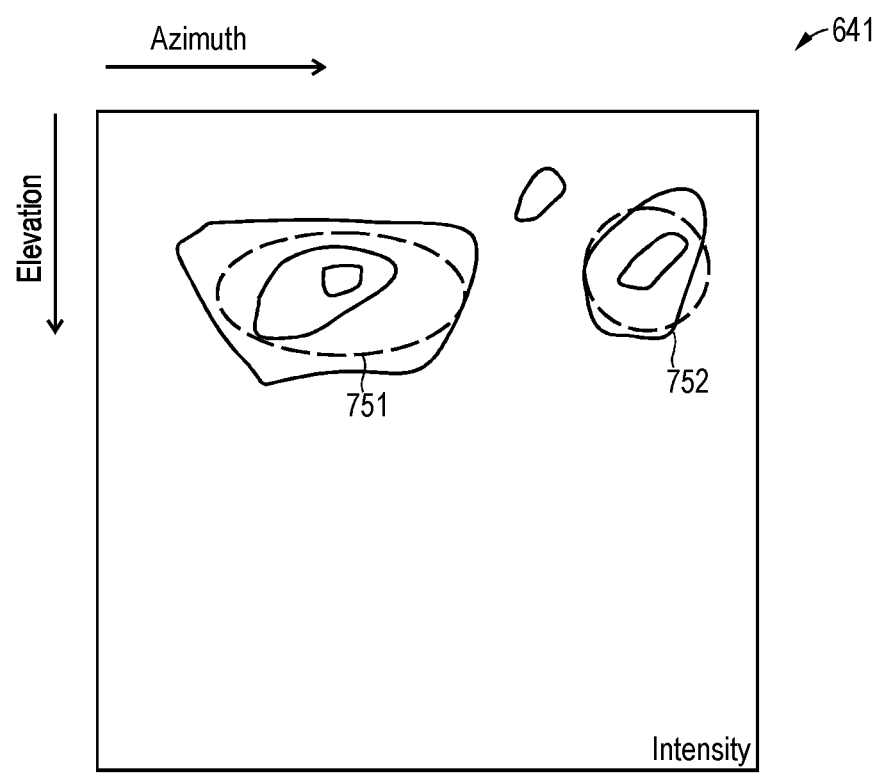
FIG. 19 schematically illustrates aspects with respect to an example implementation of a people counting algorithm that is based on unsupervised clustering.

A further implementation of the people-counting algorithm in accordance with TAB. 1: example II is illustrated in connection with FIG. 19. In FIG. 19, the 2-D angular intensity map 641 of FIG. 16 is illustrated. Additionally, two clusters 751, 752 have been identified by a unsupervised clustering algorithm, e.g., DBSCAN.

As will be appreciated, in FIG. 18 in FIG. 19, implementations of box 4050, i.e., the PC operation, have been explained, where the PC operation determines the people count based on single ones of the 2-D angular intensity maps 641-644. Then, the overall people count 115 shows a time dependency. Such time dependency is illustrated in FIG. 20.

Figure 20:
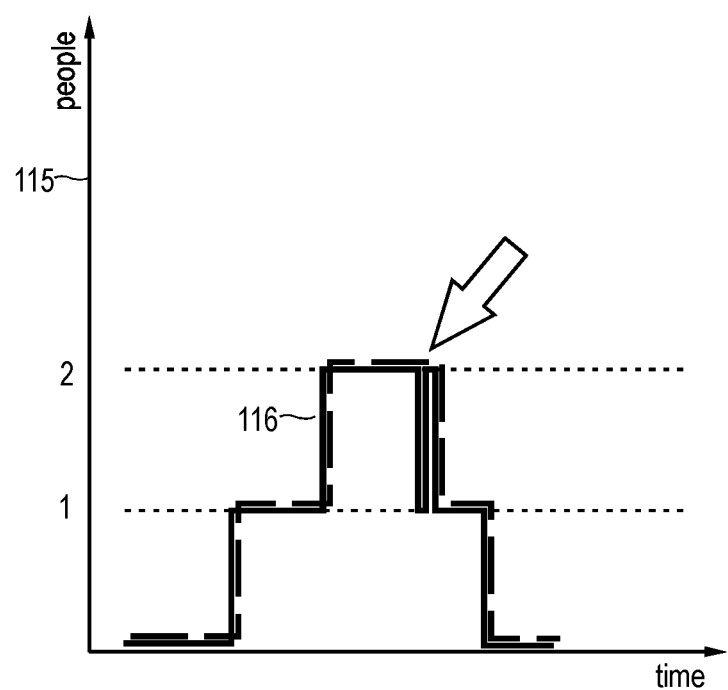
FIG. 20 schematically illustrates a time-dependency of the people count and further illustrates the smoothing of the time-dependency.

FIG. 20 illustrates aspects with respect to the determined people count 115 over the course of time. The time-dependency 116 of the people count is shown.

As illustrated, the people count 115 (solid line) switches between different values, e.g., one person present or two persons present. Illustrated by the arrow is a temporal regime where fast switches between different people counts 115 are observed. Such fast switches have been observed for scenarios in which the people count 115 is determined based on individual 2-D angular intensity maps, e.g., in accordance with TAB. 1: example I or II.

According to various examples, it would be possible that the PC operation includes a smoothing of the time dependency 116 of the people count 115. This can be, in particular, helpful where the people count 115 is determined based on individual 2-D angular intensity maps 641-644. A smoothed time dependency 116 of the people count 115 as illustrated in FIG. 20 using the dashed line.

There are various options available for smoothing the time-dependency of the people count 115. For instance, it would be possible to implement a hysteresis for switching between different people counts 115. Such hysteresis can require a minimum settling time at each individual people count 115 before switching back to a previous value of the people count 115. Another option would be to implement a Markovian decision chain where state transitions between different states of the Markovian decision chains are associated with switching event between different values of the people count 115. Such state transitions can be associated with predetermined switching probabilities. Such techniques stabilize the people count 115 in time domain.

There are further options available for implementing such smoothing. One further option would rely on tracking a movement or determining entry/exit events.

For example, as shown in FIG. 17: box 4055, positions of multiple persons in the scene 80 can be tracked. Here, the positions of the persons can be determined. A separate positioning algorithm may be used that may operate based on the same input data 999 also used for the PC algorithm 11. It would even be possible that the PC algorithm 11 provides, in addition to the people count 115, also an indication of the positions of all counted persons. For instance, this could be possible using an unsupervised clustering algorithm (cf. TAB. 1, example II): here, the position of the persons can be associated with the centers of the clusters 751-752 (cf. FIG. 19). Also, a NN can output a position of the persons (cf. TAB. 1: example III).

Figure 21:
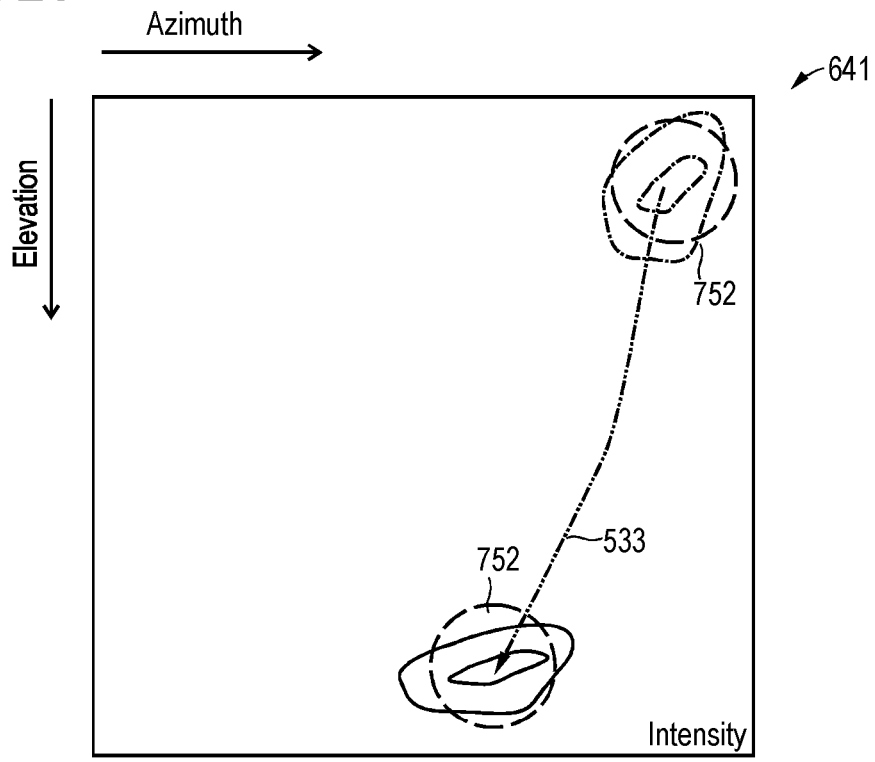
FIG. 21 schematically illustrates tracking a movement of persons through the scene.

Based on these positions of the persons in the scene, it would then be possible to track a movement of the persons. This is illustrated in FIG. 21. Here, a movement 533 of a person associated with a respective cluster 752 is tracked throughout the scene. For implementing such tracking, a tracking algorithm can be used. Conventional tracking algorithms can be employed, e.g., relying on motion model such as constant velocity or constant turn rate in combination with a Kalman filter.

As illustrated in FIG. 17, it would then be possible to provide an output of the tracking executed at box 4055 as further input data 999 to the PC algorithm 11. Thereby, the PC algorithm 111 can determine the people count based on the movement tracked for the tract further persons in the scene. For instance, a prediction of the position of persons previously detected in the scene 80 can be considered as part of the cluster detection. It would also be possible to provide such predictions of the positions of persons as a further input channel to a NN, such as a recurrent network.

More generally, the PC operation can consider the movement 533. For instance, smoothing of the time dependency 116 can consider the result of the tracking.

Generally, by using tracking, sudden changes in the people count 115 can be avoided.

Figure 22:
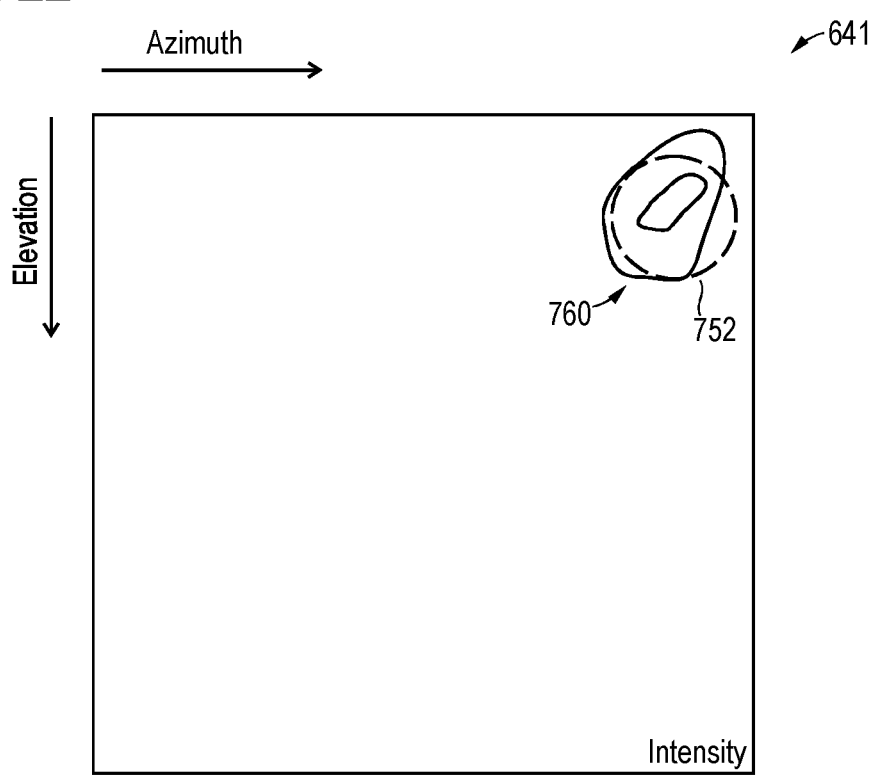
FIG. 22 schematically illustrates entry/exit events of persons entering or exiting the scene.

FIG. 22 illustrates a further technique for avoiding inconsistent time-dependencies of the people count 115. In FIG. 22, an entry/exit event 760 is illustrated. Here, a cluster 752 is located at small elevation angles, close to the border of the scene 80. Accordingly, it can be judged that a person newly enters or exits the scene 80. Such entry/exit of a person into or from the scene 80 equates with a change in the people count 115. Accordingly, it would be possible that people entry or exit events are detected in the 2-D angular intensity maps 641-644. Then, the PC operation can determine the people count based on said detecting of the people entry or exit events. For instance, a hysteresis could be overridden in response to an entry/exit event. It would be possible to consider adjusted transition probabilities of a Markovian process.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

For illustration, various examples have been disclosed in which a PC operation includes using a NN. Generally, other types of machine-learning algorithms may be used.

What is claimed is:

1. A method comprising:
obtaining one or more radar measurement frames, each one of the one or more radar measurement frames including respective data samples acquired by a radar sensor monitoring a scene;
for each one of the one or more radar measurement frames:
determining a respective range-doppler image based on the respective data samples of the respective radar measurement frame,
determining a respective 2-D angular intensity map of the scene based on the respective range-doppler image; and
performing a people counting operation based on the one or more 2-D angular intensity maps determined for the one or more radar measurement frames to determine a people count for the scene.

2. The method of claim 1, further comprising, for each one of the one or more radar measurement frames, determining multiple respective 2-D angular partial intensity maps for multiple Doppler frequency-shift bins of the respective range-doppler image and combining the multiple respective 2-D angular partial intensity maps to obtain the respective 2-D angular intensity map.

3. The method of claim 2, wherein each one of the multiple respective 2-D angular partial intensity maps of a respective one of the one or more radar measurement frames is determined for a selected range-doppler position of the respective data samples in the respective Doppler frequency-shift bin, the selected range-doppler position being selected based on at least one of a signal level or a predefined range threshold associated with the respective Doppler frequency-shift bin.

4. The method of claim 1, wherein the people counting operation comprises an unsupervised clustering algorithm to detect spatial clusters in each one of the one or more 2-D angular intensity maps, and wherein the method further comprises determining the people count based on the spatial clusters.

5. The method of claim 4, wherein the unsupervised clustering algorithm is parameterized using one or more counting metrics, and wherein the one or more counting metrics include: minimum spatial points per cluster, minimum spatial inter-cluster distance, or minimum integrated cluster intensity.

6. The method of claim 1, wherein the people counting operation comprises using one or more neural network algorithms, at least one of the one or more neural network algorithms comprising multiple temporal input channels, wherein an input data to the multiple temporal input channels is based on different ones of the one or more 2-D angular intensity maps.

7. The method of claim 6, wherein the at least one of the one or more neural network algorithms comprises a recurrent neural network.

8. The method of claim 6, wherein the one or more neural network algorithms comprise an auto-encoder neural network algorithm, and wherein the input data to the multiple temporal input channels comprises a latent feature vector of the auto-encoder neural network algorithm obtained for the different ones of the one or more 2-D angular intensity maps.

9. The method of claim 1, further comprising smoothing a time-dependency of the people count determined for subsequent ones of the one or more radar measurement frames.

10. The method of claim 9, wherein the smoothing is based on a hysteresis or a Markovian decision chain for switching between different people counts.

11. The method of claim 1, further comprising:
determining positions for persons in the scene based on the one or more 2-D angular intensity maps determined for the one or more radar measurement frames; and
tracking a movement of the persons based on the positions.

12. The method of claim 11, wherein the people counting operation determines the people count based on the movement.

13. The method of claim 1, further comprising detecting, in the one or more 2-D angular intensity maps, people entry or exit events, wherein the people counting operation determines the people count based on the detecting of the people entry or exit events.

14. The method of claim 1, wherein the radar sensor is overhead-mounted with respect to the scene.

15. The method of claim 1, wherein each one of the one or more radar measurement frames comprises a count of N antenna channels of antennas of the radar sensor, wherein the people count is larger than N.

16. The method of claim 15, further comprising, for each one of the one or more radar measurement frames, determining multiple respective 2-D angular partial intensity maps for multiple Doppler frequency-shift bins of the respective frequency-shift bins of the respective range-Doppler image and combining the multiple respective 2-D angular partial intensity maps to obtain the respective 2-D angular intensity map, wherein a count of M Doppler frequency-shift bins is used for each one of the one or more radar measurement frames, and wherein the people count is limited to (N−1)×M.

17. A device comprising:
a radar sensor configured to transmit radar signals towards a scene and receive reflected radar signals from the scene; and
a processor configured to:
obtain one or more radar measurement frames based on the reflected radar signals, each one of the one or more radar measurement frames including respective data samples acquired by the radar sensor,
for each one of the one or more radar measurement frames,
determine a respective range-doppler image based on the respective data samples of the respective radar measurement frame,
determine a respective 2-D angular intensity map of the scene based on the respective range-doppler image, and
perform a people counting operation based on the one or more 2-D angular intensity maps determined for the one or more radar measurement frames to determine a people count for the scene.

18. The device of claim 17, wherein the radar sensor comprises a plurality of antennas, wherein each one of the one or more radar measurement frames comprises a count of N antenna channels of the plurality of antennas of the radar sensor, and wherein the people count is larger than N.

19. The device of claim 18, wherein the processor is further configured to, for each one of the one or more radar measurement frames, determine multiple respective 2-D angular partial intensity maps for multiple Doppler frequency-shift bins of the respective range-doppler image and combine the multiple respective 2-D angular partial intensity maps to obtain the respective 2-D angular intensity map, wherein a count of M Doppler frequency-shift bins is used for each one of the one or more radar measurement frames, and wherein the people count is limited to (N−1)×M.

20. The device of claim 19, wherein the multiple Doppler frequency-shift bins comprise more than 2 multiple Doppler frequency-shift bins.

21. A system comprising:
a radar sensor configured to transmit radar signals towards a scene and receive reflected radar signals from the scene; and
a processor configured to:
obtain one or more radar measurement frames based on the reflected radar signals, each one of the one or more radar measurement frames including respective data samples acquired by the radar sensor,
for each one of the one or more radar measurement frames, determine multiple respective 2-D angular partial intensity maps for multiple Doppler frequency-shift bins of the respective data samples, and combine the multiple respective 2-D angular partial intensity maps to obtain a respective 2-D angular intensity map, and
perform a people counting operation based on the one or more 2-D angular intensity maps determined for the one or more radar measurement frames to determine a people count for the scene.

* * * * *